United States Patent
Fraizer et al.

(10) Patent No.: US 10,757,255 B2
(45) Date of Patent: Aug. 25, 2020

(54) SYSTEM AND METHOD FOR SECURE INTERACTIVE VOICE RESPONSE

(71) Applicant: INTERACTIVE INTELLIGENCE GROUP, INC., Indianapolis, IN (US)

(72) Inventors: Colin P. Fraizer, Indianapolis, IN (US); James R. Ullyot, Indianapolis, IN (US); Richard Ray Schott, III, Greenwood, IN (US); Bogdan Munteanu, Indianapolis, IN (US); Lachin Urazov, Indianapolis, IN (US)

( * ) Notice: Subject to any disclaimer, the term of this patent is extended or adjusted under 35 U.S.C. 154(b) by 0 days.

(21) Appl. No.: 15/709,386

(22) Filed: Sep. 19, 2017

(65) Prior Publication Data

US 2018/0084110 A1    Mar. 22, 2018

Related U.S. Application Data

(60) Provisional application No. 62/396,649, filed on Sep. 19, 2016.

(51) Int. Cl.
*H04M 3/51* (2006.01)
*G06Q 20/02* (2012.01)
(Continued)

(52) U.S. Cl.
CPC .......... *H04M 3/5166* (2013.01); *G06Q 20/02* (2013.01); *G06Q 20/16* (2013.01); *G06Q 20/383* (2013.01); *G06Q 20/4012* (2013.01); *H04L 63/0421* (2013.01); *H04M 3/5183* (2013.01); *H04M 3/523* (2013.01); *G06Q 30/0635* (2013.01); *H04M 7/1295* (2013.01); *H04M 2201/40* (2013.01); *H04M 2203/609* (2013.01); *H04M 2203/6027* (2013.01)

(58) Field of Classification Search
None
See application file for complete search history.

(56) References Cited

U.S. PATENT DOCUMENTS 8,913,721 B1 * 12/2014 Narayanan .......... G06F 21/6245
                                                      345/626
9,247,060 B2 *  1/2016 Phelps ................ H04M 7/0012
(Continued)

FOREIGN PATENT DOCUMENTS

| EP | 2924966 A1 | 9/2015 |
|----|------------|--------|
| GB | 2534270 A  | 7/2016 |
| WO | 2008014554 A1 | 2/2008 |

OTHER PUBLICATIONS

International Search Report and Written Opinion for Application No. PCT/US2017/052343, dated Jan. 9, 2018, 16 pages.
(Continued)

*Primary Examiner* — Antim G Shah

(57) ABSTRACT

System and method for a secure interactive voice response (IVR) includes: receiving a communication from a first party regarding a transaction, over a communication network; connecting the second party with the communication to service the communication; creating an anonymous order entry for the transaction; detecting sensitive information in the communication; isolating the sensitive information in the communication from the second party; route the communication to a secure system for processing of the sensitive information; and reconnecting the communication to complete the transaction.

16 Claims, 5 Drawing Sheets

(51) Int. Cl.
*G06Q 20/40* (2012.01)
*H04L 29/06* (2006.01)
*G06Q 20/16* (2012.01)
*G06Q 20/38* (2012.01)
*H04M 3/523* (2006.01)
*H04M 7/12* (2006.01)
*G06Q 30/06* (2012.01)

(56) References Cited

U.S. PATENT DOCUMENTS

| | | | |
|---|---|---|---|
| 9,307,084 | B1 | 4/2016 | Pycko et al. |
| 9,407,758 | B1 | 8/2016 | Pycko et al. |
| 2002/0004900 | A1 | 1/2002 | Patel |
| 2011/0317828 | A1 | 12/2011 | Corfield |
| 2012/0140911 | A1* | 6/2012 | Johansen ............ H04M 3/2281 |
| | | | 379/93.02 |
| 2012/0226582 | A1* | 9/2012 | Hammad ................ G06F 21/34 |
| | | | 705/26.41 |
| 2015/0127538 | A1 | 5/2015 | Tew et al. |
| 2015/0281446 | A1* | 10/2015 | Milstein ................ H04M 3/493 |
| | | | 379/88.01 |
| 2016/0189144 | A1 | 6/2016 | Dayalan |

OTHER PUBLICATIONS

Australian Government Examination Report No. 1 for Application No. 2017326705, dated Nov. 15, 2019, 3 pages.
New Zealand Intellectual Property Office First Examination Report for Application No. 752035, dated Sep. 26, 2019, 3 pages.
Canadian Intellectual Property Office Action for Application No. 3,039,773, dated May 7, 2020, 4 pages.

* cited by examiner

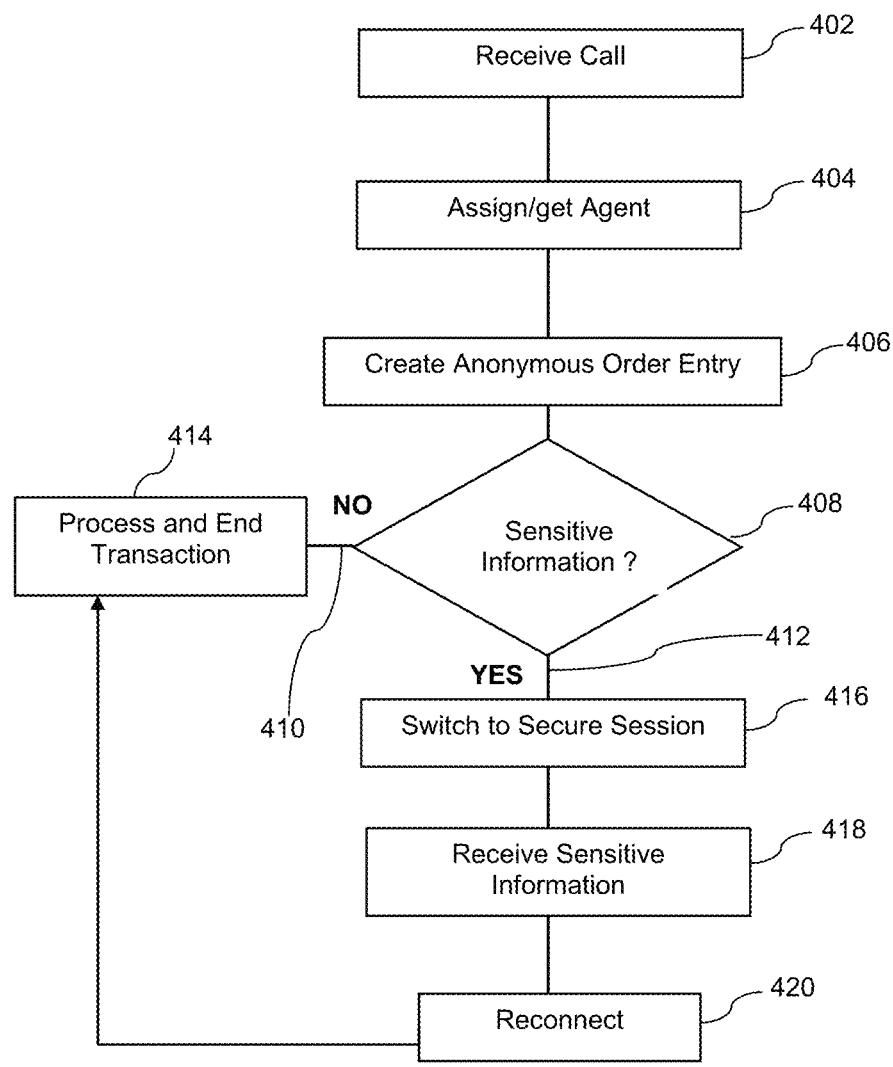

SYSTEM AND METHOD FOR SECURE INTERACTIVE VOICE RESPONSE

CROSS-REFERENCE TO RELATED APPLICATIONS

This Patent Application claims the benefit of U.S. Provisional Patent Application Ser. No. 62/396,649, filed on Sep. 19, 2016 and entitled "System And Method For Secure Interactive Voice Response," the entire content of which is herein expressly incorporated by reference.

FIELD OF THE INVENTION

The disclosed invention generally relates to interactive voice response systems and more specifically, to system and method for secure interactive voice response.

BACKGROUND

Interactive voice response (IVR) systems are used primarily to interface with callers accessing a point of service or point of routing in a communications network environment, typically a telephone environment. Modern IVR systems enable a caller to make specific menu selections by pushing a button on duel tone multi-frequency (DTMF) enabled telephones. Most modern telephones use the DTMF system. More recently, IVR systems have been improved to include voice recognition capability. Voice recognition at an IVR system often is made available in conjunction with standard DTMF pushbutton selection options.

A user may use a telephonic device to call a number that connects the user to an interactive voice response system. The interactive voice response system provides pre-recorded voice and audio information to the user and processes voice information received from the user. The telephonic device used by the user may be an intelligent telephonic device that includes a display for displaying visual information to the user, and a processor for processing multimedia information. In some cases, the interactive voice response system can interact with the intelligent telephonic device using voice, video, image or textual information. Dual mode (voice and DTMF) IVR systems/routines attempt to recognize the human voice by default, but will also accept a tone for menu selection. The menu typically prompts a user to say a particular word or phrase, or to enter an equivalent value by depressing a key on the communications device.

In a general, multi-modal interaction with a telephonic device using a call handling system is enabled by receiving a call at an interactive voice response (IVR) system of the call handling system, the call being received from a telephonic device of a caller. A voice communications session between the IVR and the telephonic device is established in response to the call. To configure the call handling system to exchange multi-modal communications with the telephonic device, a data communications session between an application server associated with the call handling system and the telephonic device is established for communication of data during the call and the IVR is enabled to execute content of one or more voice pages to exchange voice information with the caller via the voice communications session. Also, the application server associated with the call handling system is enabled to execute contents of one or more multimedia pages linked to the one or more voice pages to communicate text, image or video information to the caller via the data communications session.

IVR systems are used in a variety of applications. For example, purchasing and financial transactions, medical, health and insurance transactions, and other transactions, in which private or sensitive information and data are conveyed via voice and/or DTMF enabled telephones in order to accomplish and complete the transaction. However, such private or sensitive information of the users of the IVR systems is prone to data breach. For example, such information may be captured in recording, appear in log files that can be improperly accessed, or be audible via a listening device or person.

In fact, there has been many massive data breaches recently that have captured national attention and exposed the private data of millions of users and consumers. Most data breaches involve overexposed and vulnerable unstructured data files, documents, and sensitive information, which may include audible information. In such data breaches, sensitive, protected or confidential data is copied, transmitted, viewed, listened to, stolen or used by individuals unauthorized to do so. Moreover, the departure of a trusted staff member with (unnecessary) access to sensitive information can become a data breach if the staff member improperly discloses or uses such data. In distributed systems, this can also occur with a breakdown in or hack of any component of the system.

Most such incidents publicized in the media involve private information on individuals, i.e. social security numbers, etc. However, in most cases, loss of corporate information such as trade secrets, sensitive corporate information, details of contracts, etc. or of government information is frequently unreported.

Automatic Communication Distribution (ACD) has been typically performed on premises in a contact center environment. With the advent of cloud-based computing, ACD processing is being moved off premises and into the cloud. ACD processing for a cloud related product is usually performed completely in the cloud, where the cloud related product can perform sophisticated matching, such as on skills with routing of communications. Security and privacy problems also arise in the cloud service, where the cloud may be exposed to hacking and unauthorized access.

Accordingly, there is a need for a system and method that substantially improve security and privacy of sensitive information for the conventional IVR systems.

SUMMARY

In some embodiments, the disclosed invention is a secure interactive voice response (IVR) system. The system includes: a receiver for receiving a communication from a first party regarding a transaction, over a communication network; and an automatic communication distribution (ACD) server. The server includes: a processor to assign a second party to service the communication, create an anonymous order entry for the transaction, detect sensitive information in the communication, isolate the communication from the second party, route the communication to a secure system for processing of the sensitive information, and reconnect the communication to complete the transaction.

In some embodiments, the disclosed invention is a method and a non-transitory computer storage medium storing a plurality of instructions therein, the plurality of instructions when executed by one or more processors performing a method for a secure interactive voice response (IVR). The method includes: receiving a communication from a first party regarding a transaction, over a communication network; connecting the second party with the communication to service the communication, by the ACD processor; creating an anonymous order entry for the transaction; detecting sensitive information in the communication; isolating the sensitive information in the communication from the second party; routing the communication to a secure system for processing of the sensitive information; and reconnecting the communication to complete the transaction.

In some embodiments, the sensitive information may be transmitted to a validation service for validation. The communication may be a voice call, a duel tone multi-frequency (DTMF) call, and/or a chat communication. The communication may be connected back to the (same or another) second party to complete the transaction, or reconnected to a menu for the first party to redirect the communication. In some embodiments, the sensitive information may be detected by executing a voice recognition routine to recognize the sensitive information or a key word indicating the initiation of transmission of the sensitive information. The first party may be a consumer and the second party may be an agent.

BRIEF DESCRIPTION OF THE DRAWINGS

A more complete appreciation of the disclosed invention, and many of the attendant features and aspects thereof, will become more readily apparent as the disclosed invention becomes better understood by reference to the following detailed description when considered in conjunction with the accompanying drawings in which like reference symbols indicate like components.

FIG. 4 is an exemplary process flow for establishing a secure IVR connection, according to some embodiments of the disclosed invention.

DETAILED DESCRIPTION

In some embodiments, the disclosed invention is a secure IVR system and method that allow users (e.g., consumers) to accept and validate private information without exposing that information to personnel (e.g., agents who interact directly with the consumer through the IVR system) that do not need to access it. In some embodiments, information supplied by the consumer through the secure IVR of the disclosed invention is not captured in recordings, appear in log files, and is not audible via any listening device or feature.

In some embodiments, the disclosed invention allows control by a consumer to hide various information and what is relayed back to an agent. In some embodiments, the disclosed invention segregates sensitive data that is not disclosed to the agent, unless expressly authorized. This feature may be agent triggered where the agent initiates or may be accomplished through the IVR system where the customer prepares an order through an app or a user interface (UI) of the system and calls in, for example, for payment. In some embodiments, the sensitive data may be detected by the system by recognizing a key phrase in consumer's voice, for example "Social Security Number," "Credit Card Number," "medical or Health Information," or simply "Confidential Data."

Figure 1A:
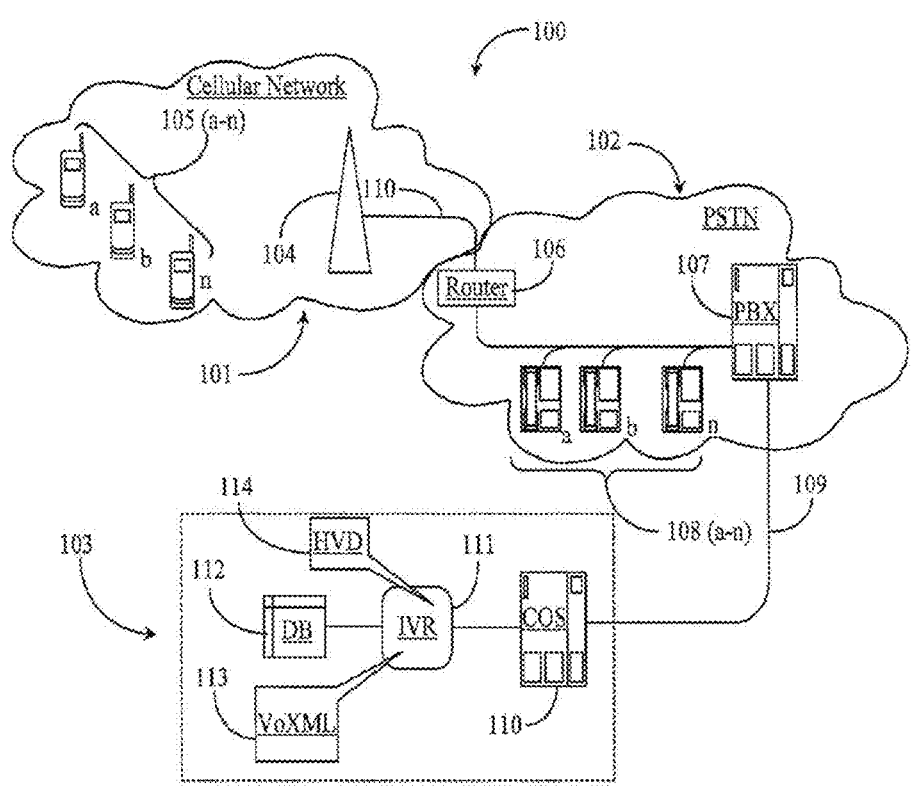
FIG. 1A is an architectural overview of an IVR system enhanced with human voice detection, according to some embodiments of the disclosed invention.

FIG. 1A is an architectural overview of a voice telephony environment 100 including an IVR system enhanced with a human voice detection function or device, according to some embodiments of the present invention. Voice telephony environment 100 includes a public switched telephone network (PSTN) 102, a cellular network 101, and a communication center service point 103. PSTN network 102 may be a private telephone network instead of a public network. PSTN network 102 includes a private branch exchange (PBX) telephony switch 107. Switch 107 may be an automated call distributor (ACD) type switch, or some other telephony network switch capable of processing and routing telephone calls. PBX 107 is connected to a central office switch (COS) 110 located within communication center service point 103 by a telephone trunk 109. Service point 103 also includes a secure IVR system 111, connected to COS 110 via a computer telephony integration (CTI) link.

Cellular network 101 may be any type of digital or analog network supporting wireless telephony without departing from the spirit and scope of the present invention. Network 101 includes a cell tower 104 connected by a telephone trunk to an edge router 106 just inside the PSTN 106. In this example, callers 105 (a-n) communicate through tower 104, which routes the call into the PSTN via trunk 110 through router 106 on to PBX 107. Callers 108 (a-n) are wired to PBX 107 via telephone wiring. COS may at times be quite different for the different networks 101 and 102 in terms of voice quality and the amount of noise interference. In general, a wired telephone on a dedicated connection has better voice quality more of the time than, for example, a cellular telephone over a shared connection. Moreover, other factors may contribute to noise that is captured from the caller environment and carried along with the voice during a call.

The secure IVR 111 intercepts calls from callers 108 (a-n) and from callers 105 (a-n) and attempts to provide service to those callers based on planned voice interaction (voice application) sessions with those callers. The voice interactions may be any type of voice interaction from those that provide internal routing to a live agent, and/or those that actually complete the call using automated transaction processing techniques.

In this example, secure IVR 111 has a voice over XML voice recognition program 113 provided that utilizes a database 112 that contains a programmable library of word and phrases to aid in recognizing voice commands, words and/or phrases spoken by the caller. The spoken voice is recognized by searching for the VoXML equivalent stored in the database. The secure IVR 111 may include one or more processors, memory, I/O circuitry and other associated circuitry known in the art.

In this example, IVR 111 has, in addition to standard voice recognition capability, an instance of human voice detection (HVD) software provided thereto and executable thereon. HVD 114 is provided to enhance the security capability of secure IVR 111 by isolating consumer's audio from recording and listening and preventing the details of the sensitive data collected from the consumer from being logged.

In operation, if caller 108a, for example, is in interaction with secure IVR 111 at switch 110, responsive to consumer's option, the secure IVR system may support two workflows: 1) validate-and-return and 2) fire-and-forget. In a validate-and-return scenario, the agent remains reserved while the consumer privately enters the sensitive data to be validated. Once the validation is complete, the consumer's audio is reconnected to the agent who can finalize the interaction with the consumer and dispose of the call according to the consumer's desires. In a fire-and-forget scenario, once the secure IVR 111 is triggered (automatically or by the agent), the agent's interaction with the consumer is ended.

After the sensitive data has been validated, the secure IVR 111 can dispose of the call according to the consumer's desires. Examples might include: disconnect the call with the consumer, route the call for assignment to a new agent, and route the call to a menu so the consumer can help direct the path of his call. In some embodiments, COS 110 has a processor, memory and associated circuitry to execute the routines.

In some embodiments, the consumer interacts with an agent, but the sensitive data (e.g., credit card information, Social Security number, etc.) is accepted via speech or DTMF, while the consumer's audio is isolated from recording and listening. Furthermore, the secure IVR 111 prevents the details of the sensitive data collected from the consumer from being logged in a file. In some embodiments, the consumer interacts only with the IVR 111, which transitions to a secure mode when the system is about to collect sensitive data.

One skilled in the art will recognize that the method described can be implemented in a telephony environment, in a voice over internet protocol environment where an IVR equivalent is implemented, or over the Internet using chat functions. For the embodiments that use chat for some or all of the communications between the consumer and the system, one skilled in the art will recognize that the cellular network 101 and/or the PSTN 102 cab be replaced by or combined with an Internet-based network, such as a local area network. The IVR system itself may be caused to switch between modes in midstream based on the application of the method integrated with controlling IVR software. In some embodiments, the above-described security routine may be plugged into an existing IVR by inserting a removable media containing the sequence start all of the tasks and the sequence end. The security routine can also be inserted into an application running on the system. For example, the security routine may be stored in a storage medium and then loaded into the system.

Figure 1B:
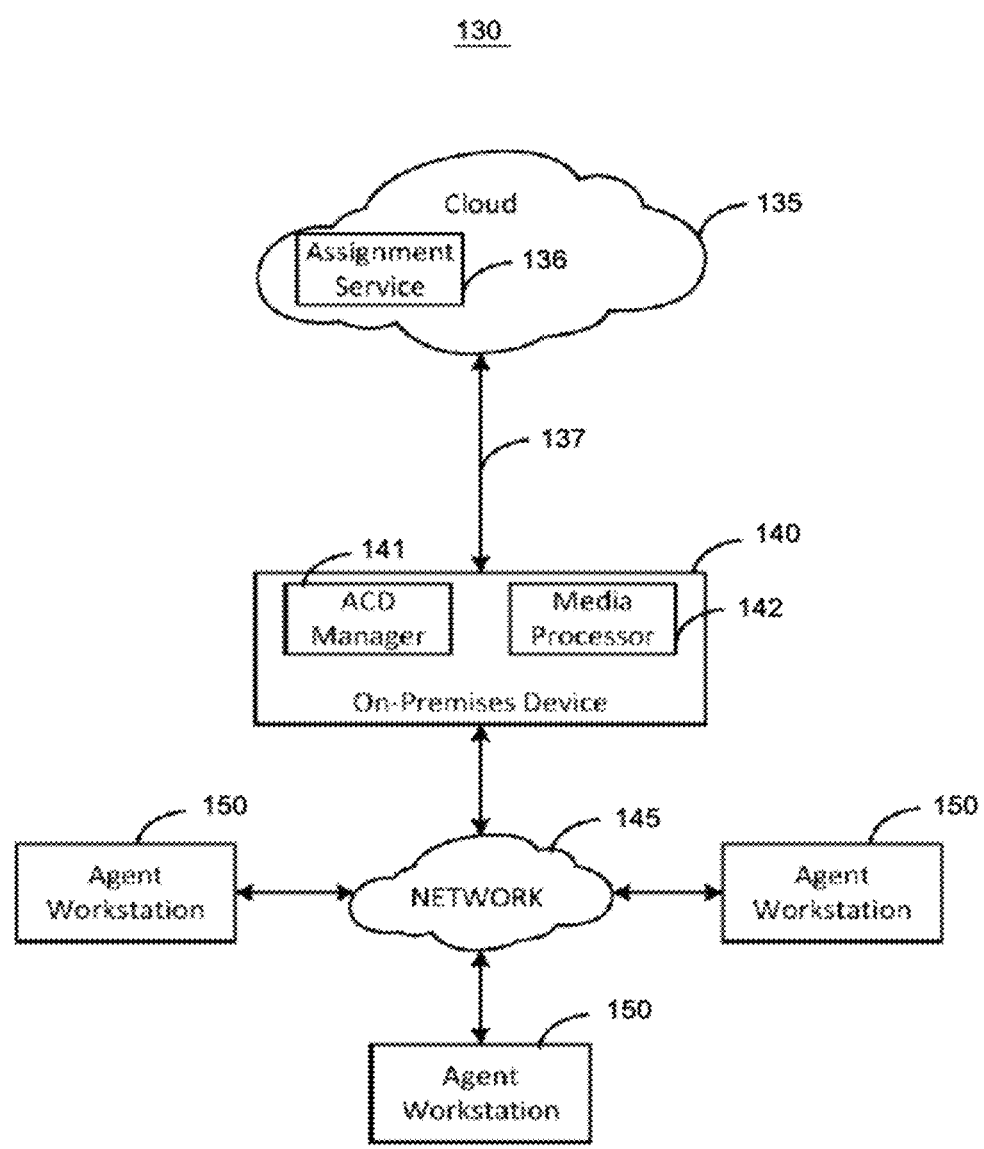
FIG. 1B is an exemplary diagram illustrating a system for ACD assignment, according to some embodiments of the disclosed invention.

FIG. 1B is an exemplary diagram illustrating a system 130 for ACD assignment, according to some embodiments of the disclosed invention. The parts of the system may comprise a device 140 on premises capable of communication with the cloud 135, and agent workstations 150 connected through a network 145 with the on-premises device 140. The cloud 135 may host an assignment service 136. The assignment service 136 may handle the routing of communications within a contact center environment. The on-premises device 140 communicates 137 with the cloud 135 and comprises capability 141 to locally manage the ACD assignment until the cloud resumes communication with the device. The on-premises device 140 may also comprise a media processor 142 which handles processes such as secure IVR and in-queue processing of media. Local assignment may be performed through an ACD management capability 141 on the device 140 that monitors ACD communication flows.

The manager 141 may also manage the logic of when to intervene and how to assign communications in queue to available agents at agent stations 150, among other functions. In a contact center environment, communications flow through the on-premises device 140 to an agent workstation via network 145. An agent workstation 150 may comprise a workstation computer coupled to a display. Workstation computers may be of the same type, or a heterogeneous combination of different computing devices. Likewise, displays may be of the same type or a heterogeneous combination of different visual devices. It should be understood that while three work stations are described in the illustrative embodiment, more may be utilized. Contact center applications of system 130 typically include many more workstations of this type at one or more physical locations, but only a few are illustrated in FIG. 1B to preserve clarity.

A digital telephone may be associated with an agent workstation 150. The digital telephone may be integrated into the agent computer and/or implemented in software. It is understood that a digital telephone, which is capable of being directly connected to network 145, may be in the form of handset, headset, or other arrangement as would occur to those skilled in the art. The agent workstations 150 may be connected through a computer network 145 to the on-premises device 140.

Figure 2:
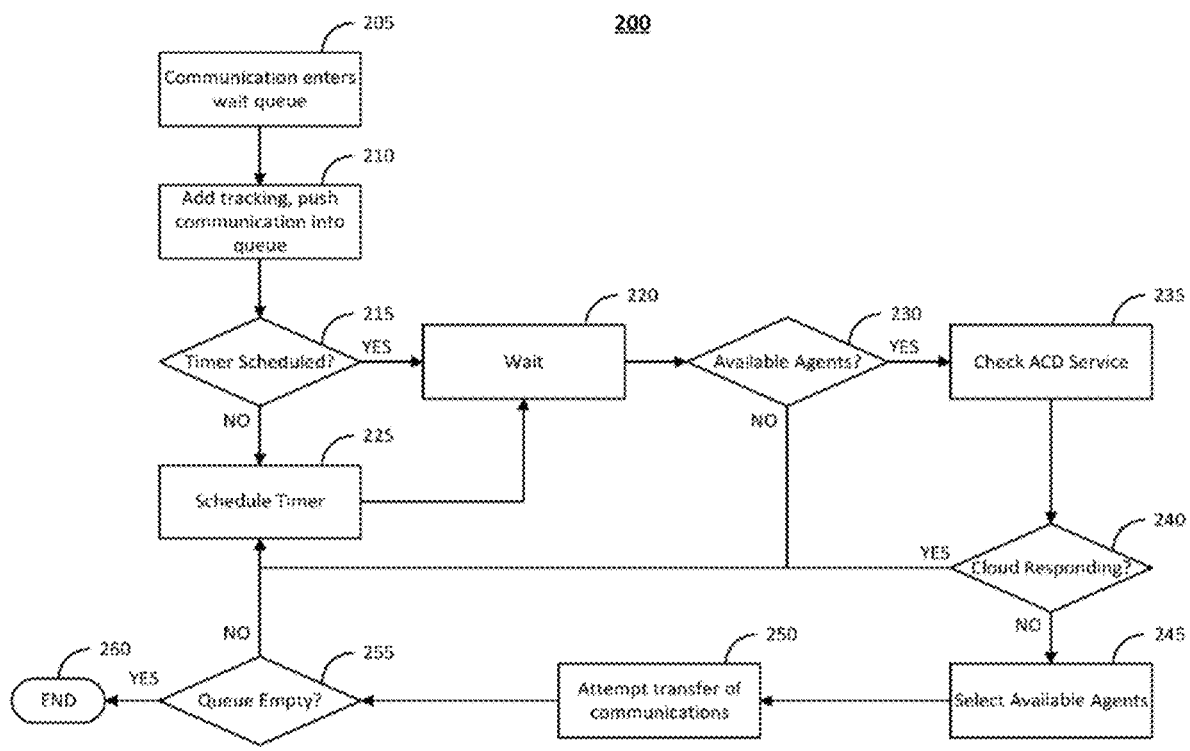
FIG. 2 is an exemplary process flow for ACD local assignment, according to some embodiments of the disclosed invention.

FIG. 2 is an exemplary process flow for ACD local assignment, according to some embodiments of the disclosed invention. The process in FIG. 2 may occur in the on-premises device 140 shown in FIG. 1B. In block 205, a communication is determined to have entered the wait queue. For example, a communication may comprise a call that is in-coming to a contact center system and has been routed into the wait queue. Control is passed to block 210 and process 200 continues.

In block 210, a tracking mechanism is added. For example, ordering may be done in a first-in-first-out manner (FIFO), or another desired ordering, such as by communication priority. In an embodiment, communications transferred into ACD queues are tracked in order to discriminate them from non-ACD communications, which are not processed. Control is passed to block 215 and process 200 continues.

In block 215, it is determined whether or not an assignment timer has been scheduled. If it is determined that an assignment timer has been scheduled, control is passed to block 220 and the process continues. If it is determined that an assignment timer has not been scheduled, control is passed to block 225 and the process continues.

The determination in block 215 may be made in any suitable manner. In an embodiment, a timer may be started when a queue status is non-empty. Where there are no ACD communications in the system, a timer may not be initiated. The amount of time the timer is scheduled for may be set to any desired amount of time, such as 30 seconds, to name a non-limiting example.

In block 220, the process waits until the assignment timer completes. For example, the assignment timer reaches its determined endpoint, such as the passing of a pre-determined amount of time, for example. Control is passed to block 230 and process 200 continues.

In block 225, an assignment timer is scheduled. In an embodiment, if this is not the first time an assignment timer is scheduled for a particular communication, a shorter assignment timer may be scheduled. The length of the time may comprise any pre-determined time interval, such as 30 seconds to name a non-limiting example, and may be tuned depending on the desires of the user. In an embodiment, a communication may have multiple successive timers assigned to it through the course of the process 200 until it is handled. Control is passed to block 220 and process 200 continues.

In block 230, it is determined whether or not agents are available. If it is determined that agents are available, control is passed to block 235 and the process continues. If it is determined that agents are not available, control is passed back to block 225 and the process continues.

The determination in block 230 may be made by any suitable means. For example, the system may determine that there are agents logged in to their work stations with active statuses in the contact center management application.

In block 235, a check of the ACD service is performed. In some embodiments, the on-premises device may wait for a response from the cloud ACD service for a designated amount of time. In some embodiments, a round trip request to the assignment service may be performed to see if the assignment service is fully functional. The assignment service may have partial functionality where certain components are not functioning. Control is passed to block 240 and process 200 continues.

In block 240, it is determined whether or not the cloud service is responding. If it is determined that the cloud is responding, control is passed back to block 225 and the process continues. If it is determined that the cloud is not responding, control is passed to block 245 and the process continues.

The determination in block 240 may be accomplished through the on-premises device querying the cloud. In some embodiments, to check the cloud, the on-premises device may use the same restful communication paths as normal cloud responses would travel. Any caches with a max-age=0 and max-state=0 may be by-passed. A timeout and some error responses may be considered failures and trigger the local assignment function of the on-premises device. A successful response by the cloud that it is processing requests may be considered a "success" and the on-premises device takes no action on the communications.

When the on-premises device confirms proper communication with the cloud and that it is working properly, the on-premises device will not intervene and continue to wait for the cloud assignment service to perform its function. In some embodiments, when the device determines that the assignment service is not properly functioning, the device takes control until criteria are met. Examples of criteria may include: no more communications left in the queue, the cloud begins to function again, etc. Emptying of the queue may occur for a number of reasons, such as assignments from the device, cloud, call disconnects, or transfers to other endpoints. The system may be tolerant of communications leaving the queue for any reason.

In block 245, the on-premises device selects a designated number of agents. In an embodiment, the designated number of agents may comprise a threshold number of the longest available agents associated with the contact center. The threshold number of agents may be pre-determined, such that perhaps the ten longest available agents are selected. The order in which they are selected may be shuffled to avoid assigning the same communications to the same agents to pre-empt situations where stations are abandoned or agents are not answering the communications. This may also prevent the longest waiting communication from being assigned to the station that has been abandoned the longest. Control is passed to block 250 and process 200 continues.

In block 250, transfer is attempted of the communication. For example, the device may attempt to transfer the longest waiting communications to the selected agents from block 240. In some embodiments, transfers may comprise regularly attended transfers that occur in the same manner as if the transfer was issued by the cloud (as opposed to the on-premises device). In some embodiments, attended transfer allows the communicant to continue hearing wait announcements, hold-music, or other information, while waiting for an agent while the agent is alerted to handle the transferred communication. Control is passed to block 255 and process 200 continues.

In block 255, it is determined whether or not the communication queue is empty. If it is determined that the queue is empty, control is passed to block 260 and the process 200 ends. If it is determined that the queue is not empty, control is passed back to block 225 and the process 200 continues.

Figure 3:
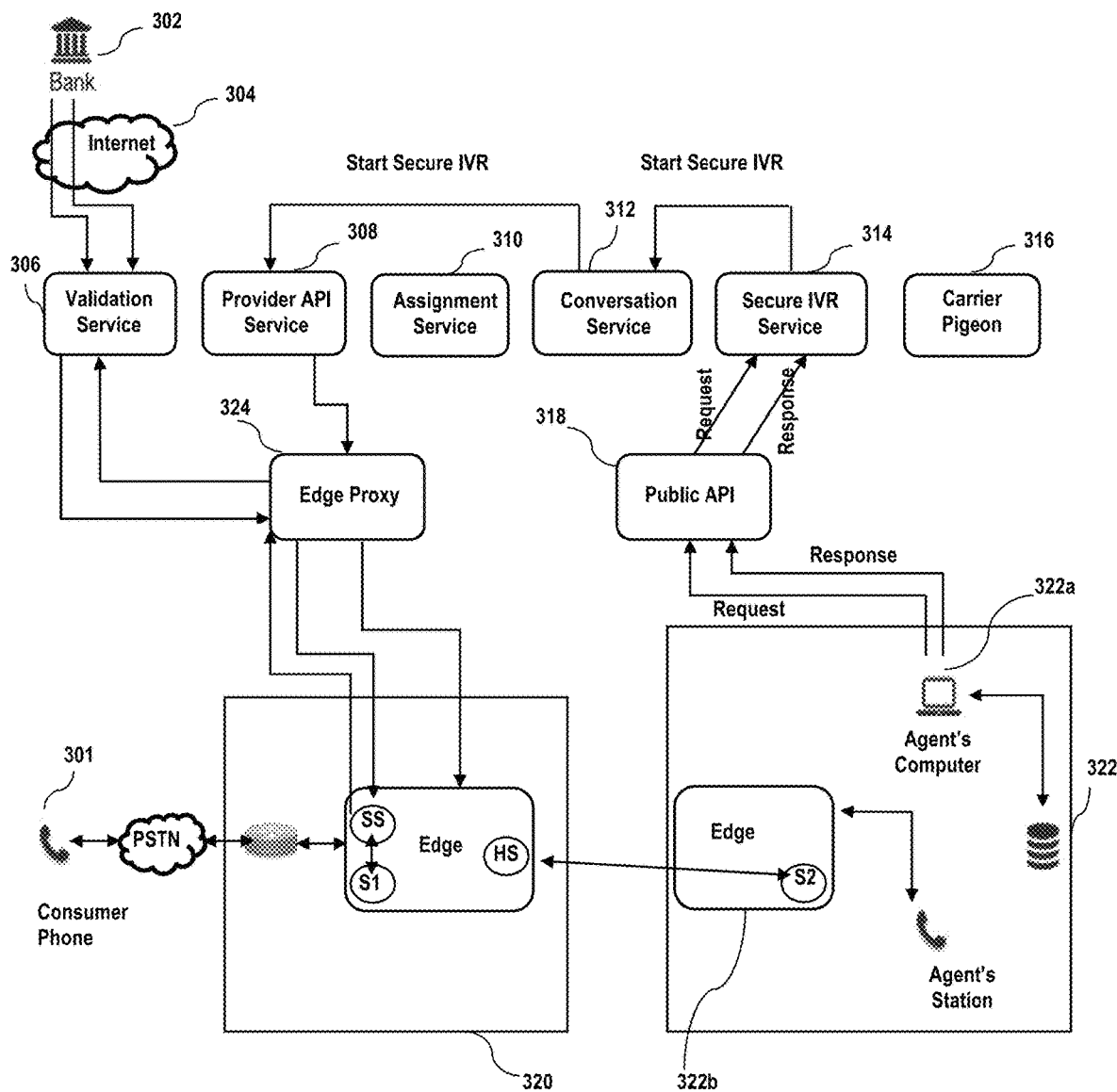
FIG. 3 shows an exemplary block diagram for a secure IVR system, according to some embodiments of the disclosed invention.

FIG. 3 shows an exemplary block diagram for a secure IVR system, according to some embodiments of the disclosed invention. In this example, a consumer is using a phone 301 to communicate, via a consumer edge device 320, with an agent's station 322 including an agent computer 322a and an agent edge device 322b. The edge devices 320 and 322b may merely monitor the cloud service's activity where the cloud service is assigning and transferring communications under normal conditions. In some embodiments, the devices query the cloud service prior to locally routing the communications to determine if the criteria are there for local routing. When the consumer edge device 320 transfers communications to agent station 322, the device does so in a non-intrusive way while continuously checking to see if the cloud service has resumed operations. If the device determines that the cloud service has resumed operations, then the device yields to the cloud.

The secure IVR system may support two workflows: 1) validate-and-return and 2) fire-and-forget. In a validate-and-return scenario, the agent remains reserved while the consumer privately enters the sensitive data to be validated. Once the validation is complete, the consumer's audio is reconnected to the agent who can finalize the interaction with the consumer and dispose of the call according to the consumer's desires. In a fire-and-forget scenario, once the secure IVR system is triggered (automatically or by the agent), the agent's interaction with the consumer is ended.

The secure IVR system also includes one or more server computers to execute a validation service 306, a provider API 308, an assignment service 310, a conversation service 312, a carrier pigeon 316, an edge proxy 324, and a public API 318 for secure interaction with a bank 302 via the Internet 304. The operations of these components are described below with respect to the process flow of FIG. 4.

FIG. 4 is an exemplary process flow for establishing a secure IVR connection, according to some embodiments of the disclosed invention. As shown in block 402, a call or request through an online chat function is received by a receiver of an entity "ExampleCo" from a first party, for example, a consumer (using a device, such as a phone or computer), for instance, for placing an order for a product. It Is understood that the disclosed invention is not limited to placing a phone call through a cellular or Internet network, rather, it is also applicable to chat functions over the Internet. In the optional block 404, the call or request is assigned to a second party, for example, an agent via ACD and a request is received from the consumer. Alternatively the call or request can be forwarded directly to the system without the involvement of an agent. The agent may be a human agent or a system (robot) agent.

In block 406, an anonymous order entry is created for the consumer. For example, the system or the agent uses an order-entry application, which may be integrated to system using a Public API (318). In the case of an agent, the agent may utter: "I've created order number 1001 for one widget. The total amount is one hundred dollars." In some embodiments, a screen pop functionality may expose the conversation identifier and the participant identifier for this call from the consumer. The screen pop identifies a particular party on a call (but not necessarily the identity of that party). For instance, it identifies "the consumer participant of agent's current call," not the identifiable information, such as name and address of the consumer. In some embodiments, ExampleCo's order entry application records in their database the conversation id (optional), the participant id (optional), the order number, and the total amount, but no sensitive data is recorded or reported.

In block 408, if sensitive or confidential information is detected, the system switches to a secure IVR process, in block 416. For example, when and if the consumer alludes to some sensitive information, for example, "I'd like to pay by credit card," such sensitive information is detected and recognized by the system to initiate a secure IVR process for this call. Alternatively, the agent can press a button in the ExampleCo order-entry application to initiate the secure IVR process. In some embodiments, the consumer may press a button to initiate the secure IVR process. In some embodiments, the detection of sensitive or confidential information can be agent triggered where the agent initiates, can be done through the IVR where customer prepares an order through an app or the system and calls in for payment or can be automatically detected by the system as explained above.

If no sensitive or confidential information is detected (410), the order is processed and the transaction is completed in block 414. In some embodiments, in block 416, ExampleCo's order-entry application goes to work and posts a message to cloud's Public API with a universal resource identifier (URI) indicating the desire to begin a secure IVR session with the consumer. In some embodiments, the message may include a conversation id, indicating the conversation in which the agent triggers secure IVR; a participant id indicating which participant in the call will interact with the secure IVR; an identifier that specifies which secure IVR flow to execute (for example, ExampleCo might have a secure IVR for: SecureCC that validates a credit card for a new order, SecurePIN that validates the consumer's secret PIN to add a new shipping address); and arbitrary (opaque) data that will be used by the ExampleCo-designed flow to complete the validation. For this example, this could simply be the order number.

In block 418, the sensitive information is received without exposing it to the agent, logging it is the system or reporting it. In some embodiments, the secure flow ID is typically configured into, for example, the order-entry application and selected when sensitive information is detected, for example, when agent presses some "Credit Card Payment" button or the system automatically detects some key words uttered by the consumer, request and then response occurs. The Public API 318 relays the request to the Secure IVR Service 314. This service matches up requests for secure IVR with responses. When it receives a request, it generates the invocation identifier, creates a resource that holds the results of the secure IVR session, returns the invocation identifier to the requesting application (ExampleCo's order-entry application) via the Public API, and adds the invocation id to the request so that it is available to components downstream. In some embodiments, the Public API 318 is accessible by the public, which makes it useful for the integration of the system with other systems.

In some embodiments, the invocation id is distinct from the participant id as a consumer may interact with more than one secure IVR sessions during the same telephone call. For example, when the consumer wants to add a new shipping address and needs to securely provide her ExampleCo PIN, in the same call, consumer places an order for one widget and securely provides her credit card information for payment. Each of these interactions with a secure IVR is identified by a unique invocation id, though they would share the same participant identifier. Secure IVR Service relays the request to a Conversation Service 312 for processing.

The Conversation Service 312 relays the request to the Provider API Service 308. Conversation Services uses the provided "conversationId" and "participantId" to find the "communication" and routes the message to the Provider API Service. The Provider API Service sends the command to the consumer edge device 320. The Provider API Service passes along the message body to the appropriate session on the appropriate edge device. In this example, it would be the consumer edge device 320 on which the call or (chat) request arrived (or is currently managed). In some embodiments, the mechanism is a Server-Sent Event that passes through an edge proxy 324 to the appropriate session on the consumer edge device 320. The consumer edge device 320 resolves the provided "flowId" to a particular VoiceXML entry-point. This may be done using a known Dialplan mechanisms. The provided "flowId" is then used to create an IVR session for the consumer. This IVR session isolates its audio, DTMF or chat so it cannot be recorded nor listened-to, and restricts logging to prevent sensitive data from appearing in logs. Also, any reporting of the sensitive information is prohibited. The edge device fetches (if necessary) and invokes the indicated VoiceXML document, which was generated by a VoiceXML generator when the secure IVR flow was established and makes the contents of the secure IVR request available to the executing VoiceXML. In some embodiments, at this point the IVR participant for that secure call flow is added to the conversation and the audio is no longer available to the agent while the consumer (caller/callee) interacts with the secure system. Recordings are also disabled by the edge routine.

In block 420, the consumer is reconnected to the agent, another agent or the system and the transaction is processed and completed in block 414. In some embodiments, a "SecureCC" process invokes a "Bridge Action" to fetch the order details from a Customer Order Database and accepts consumer's sensitive data via DTMF or speech. Sensitive data may include account number, expiration month, expiration year, passwords, CVV number and the like. As part of the processing of the transaction in block 414, some or all of the sensitive information may need to be validated, which is described in more detail below. In some embodiments, the secure IVR system encrypts all the sensitive data for further security and privacy.

In some embodiments, some or all of the sensitive data is validated by appropriate validators utilizing a validation service 306. The data required for validation will vary, depending on the nature of the task. In some embodiments, the entity that actually performs the validation (validator) is configured by the system. Examples of some validators are the U.S. Social Security Administration for validating that a particular SSN is valid, a credit card validation service that accepts credit card account information and the requested amount and approves or denies the credit request, a web service to validate a consumer's PIN without allowing potentially-untrusted personnel access to the PIN, and the line. In some embodiments, the "signature" of a particular validation may be configured by a system administrator when he decides to use the secure IVR feature. For example, the system administrator inputs for credit card validation might be: consumer-sensitive data (e.g., account number, expiration month, expiration year, CVV number), non-consumer-sensitive data (e.g., total amount, product category (miscellaneous widgets)). Outputs of this process include approval or denial and a confirmation number.

As described above, the present invention substantially improves security and privacy of sensitive information for the conventional IVR systems that lacked such security measures, for various industries, such as baking, commerce, government, health and medical, insurance industries and the like, by detecting, isolating and securing the sensitive information.

In some embodiments, the VoiceXML application invokes an appropriate validation service validator. The VoiceXML application notifies the Secure IVR Service 314 of the result of validation. Optionally, the VoiceXML application can use a bridge action to record the status and other data to other systems, such as an order-entry database. Secure IVR Service records are completed. In some embodiments, Secure IVR Service indicates completion to a Carrier Pigeon 316, which may use a WebSockets message to notify the ExampleCo agent application that runs on Agent's computer 322a that the transaction was approved. Consumer may then be re-connected with Agent. The end of the IVR session is an indication that the edge process can exit the "Secure IVR Mode". After the sensitive data has been validated, the secure IVR 111 can dispose of the call according to the consumer's desires. Examples might include: disconnect the call with the consumer, route the call for assignment to a new agent, and route the call to a menu so the consumer can help direct the path of his call.

Possible endings of the IVR session comprise:

1) Agent has waited while consumer performed her validation. The flow "SecureCC" ended without otherwise disposing of the call, so the edge device that hosted the IVR session should reverse whatever audio isolation it performed (communicating with other edge devices as necessary) to that consumer and can resume conversing with the agent. Any recordings that would have included consumer's audio (save for her isolation in secure IVR) can now resume including her audio in the recordings. Any listeners that would have heard consumer's audio should start receiving it. Logging should resume as otherwise configured.

2) Agent has moved on, per ExampleCo's policy. In the fire-and-forget mode, the agent is not expected to wait for consumer's return. In this scenario, it is the responsibility of the secure IVR process (e.g. "SecureCC") to dispose of the call before the flow ends. Possibilities include consumer's call is transferred to a new number or a new menu, consumer's call is re-sent to Assignment Service 310 for ACD assignment to a new agent.

3) Agent has moved on inappropriately. If the secure IVR process ends without disposing of the call, but agent has disconnected his side of the call, consumer will be disconnected.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims and drawings.

The invention claimed is:

1. A interactive voice response (IVR) system comprising:
a receiver for receiving a communication from a first party regarding a transaction, over a communication network; and
an automatic communication distribution (ACD) server including a processor to:
assign a second party to service the communication,
create an anonymous order entry for the transaction, wherein the anonymous order entry excludes a name and an address of the first party,
detect sensitive information in the communication by executing a voice recognition routine to recognize the sensitive information or to recognize a spoken key word indicating an initiation of transmission of the sensitive information,
isolate the communication from the second party,
execute the anonymous order entry to post a message to a public API accessible over a computer network indicating to the system a desire to begin a secure IVR session,
route the communication to a secure system for receiving and processing of the sensitive information; and
after the sensitive information is received by the secure system, reconnect the communication to a menu for the first party to choose to redirect the communication made by the first party to a third party.

2. The IVR system of claim 1, wherein the processor transmits the sensitive information to a validation service for validation.

3. The IVR system of claim 1, wherein the anonymous order entry includes a conversation id, a participant id, an order number, and a total amount for the transaction, and wherein the anonymous order entry does not include any sensitive information.

4. The IVR system of claim 1, wherein the communication is a voice call, a duel tone multi-frequency (DTMF) call, or a chat communication.

5. The IVR system of claim 1, wherein said message includes a conversation id, a participant id, an identifier that specifies which secure IVR routine to execute, a secure PIN, and information for validating the sensitive information.

6. The IVR system of claim 1, wherein the first party is a consumer and the second party is an agent.

7. The IVR system of claim 1, wherein the processor reconnects the communication back to the second party to complete the transaction.

8. A method for a secure interactive voice response (IVR) in an IVR system, wherein the system is operatively connected with an Automatic Communication Distribution (ACD) processor, the method comprising:
receiving, by the IVR system, a communication from a first party regarding a transaction, over a communication network;
connecting the second party with the communication to service the communication, by the ACD processor;
creating, by the IVR system, an anonymous order entry for the transaction, wherein the anonymous order entry excludes a name and an address of the first party;
detecting, by the IVR system, sensitive information in the communication by executing a voice recognition routine to recognize the sensitive information or to recognize a spoken key word indicating an initiation of transmission of the sensitive information;

isolating, by the IVR system, the sensitive information in the communication from the agent;

executing the anonymous order entry to post a message to a public API accessible over a computer network indicating to the system a desire to begin a secure IVR session;

routing, by the ACD processor, the communication to a secure system for receiving and processing of the sensitive information; and after the sensitive information is received by the secure system, reconnecting, by the ACD processor, the communication to a menu for the first party to choose to redirect the communication made by the first party to a third party.

9. The method of claim 8, wherein the anonymous order entry includes a conversation id, a participant id, an order number, and a total amount for the transaction, and wherein the anonymous order entry does not include any sensitive information.

10. The method of claim 8, wherein the communication is a voice call, a duel tone multi-frequency (DTMF) call, or a chat communication.

11. The method of claim 8, further comprising reconnecting the communication back to the second party to complete the transaction, or reconnecting the communication to a menu for the first party to redirect the communication.

12. The method of claim 8, wherein said message includes a conversation id, a participant id, an identifier that specifies which secure IVR routine to execute, a secure PIN, and information for validating the sensitive information.

13. The method of claim 8, wherein the first party is a consumer and the second party is an agent.

14. A non-transitory computer storage medium storing a plurality of instructions therein, the plurality of instructions when executed by one or more processors performing a method for a secure interactive voice response (IVR) in an IVR system, wherein the system is operatively connected with an Automatic Communication Distribution (ACD) processor, the method comprising:

receiving, by the IVR system, a communication from a first party regarding a transaction, over a communication network;

connecting the second party with the communication to service the communication, by the ACD processor;

creating, by the IVR system, an anonymous order entry for the transaction, wherein the anonymous order entry excludes a name and an address of the first party;

detecting, by the IVR system, sensitive information in the communication by executing a voice recognition routine to recognize the sensitive information or to recognize a spoken key word indicating an initiation of transmission of the sensitive information;

isolating, by the IVR system, the sensitive information in the communication from the agent;

executing the anonymous order entry to post a message to a public API accessible over a computer network indicating to the system a desire to begin a secure IVR session;

routing, by the ACD processor, the communication to a secure system for receiving and processing of the sensitive information; and after the sensitive information is received by the secure system, reconnecting, by the ACD processor, the communication to a menu for the first party to choose to redirect the communication made by the first party to a third party.

15. The non-transitory computer storage medium of claim 14, wherein the first party is a consumer and the second party is an agent.

16. The non-transitory computer storage medium of claim 14, wherein the communication is a voice call, a duel tone multi-frequency (DTMF) call, or a chat communication.

* * * * *